United States Patent [19]

Myszka

[11] Patent Number: 5,507,586
[45] Date of Patent: Apr. 16, 1996

[54] SPINDLE HUB SPACER INTERCONNECTION

[75] Inventor: Kevin Myszka, Copley, Ohio

[73] Assignee: MTD Products Inc., Cleveland, Ohio

[21] Appl. No.: 504,461

[22] Filed: Jul. 20, 1995

Related U.S. Application Data

[63] Continuation of Ser. No. 145,566, Nov. 4, 1993, abandoned.

[51] Int. Cl.⁶ .................................................... F16B 2/02
[52] U.S. Cl. .......................... 403/365; 403/359; 403/259; 56/17.5; 474/903
[58] Field of Search .................................. 403/365, 359, 403/289, 261, 263, 258, 240, 243, 254; 56/17.5, 255, DIG. 22; 474/903, 199

[56] References Cited

U.S. PATENT DOCUMENTS

| | | | |
|---|---|---|---|
| 611,556 | 9/1898 | Blanton, Jr. ........................ 403/359 X |
| 2,443,688 | 6/1948 | McFarland ........................ 403/359 X |
| 2,691,899 | 10/1954 | Brown ................................ 403/365 X |
| 3,798,987 | 3/1974 | Hurd et al. ........................ 474/199 X |
| 3,875,728 | 4/1975 | Bacon ................................ 56/17.5 |
| 3,916,706 | 11/1975 | Shaw .................................. 474/199 |
| 3,967,438 | 7/1976 | Tombers ............................. 56/17.5 X |
| 4,144,755 | 3/1979 | Palloch ............................. 474/903 X |
| 4,478,029 | 10/1984 | Moore et al. ..................... 56/17.5 |
| 4,827,800 | 5/1989 | Pedersen et al. ................ 403/359 X |
| 4,989,398 | 2/1991 | Kuhn et al. ....................... 56/17.5 |
| 5,002,422 | 3/1991 | Schremmer et al. ............. 403/359 |
| 5,117,617 | 6/1992 | Scag ................................... 56/17.5 |

Primary Examiner—Kenneth J. Dorner
Assistant Examiner—Harry C. Kim
Attorney, Agent, or Firm—Lightbody & Lucas

[57] ABSTRACT

A generally cylindrical hub spacer having inwardly and outwardly extending protrusions is used to rotationally interconnect a deck pulley to a spindle assembly in a lawn mower.

17 Claims, 2 Drawing Sheets

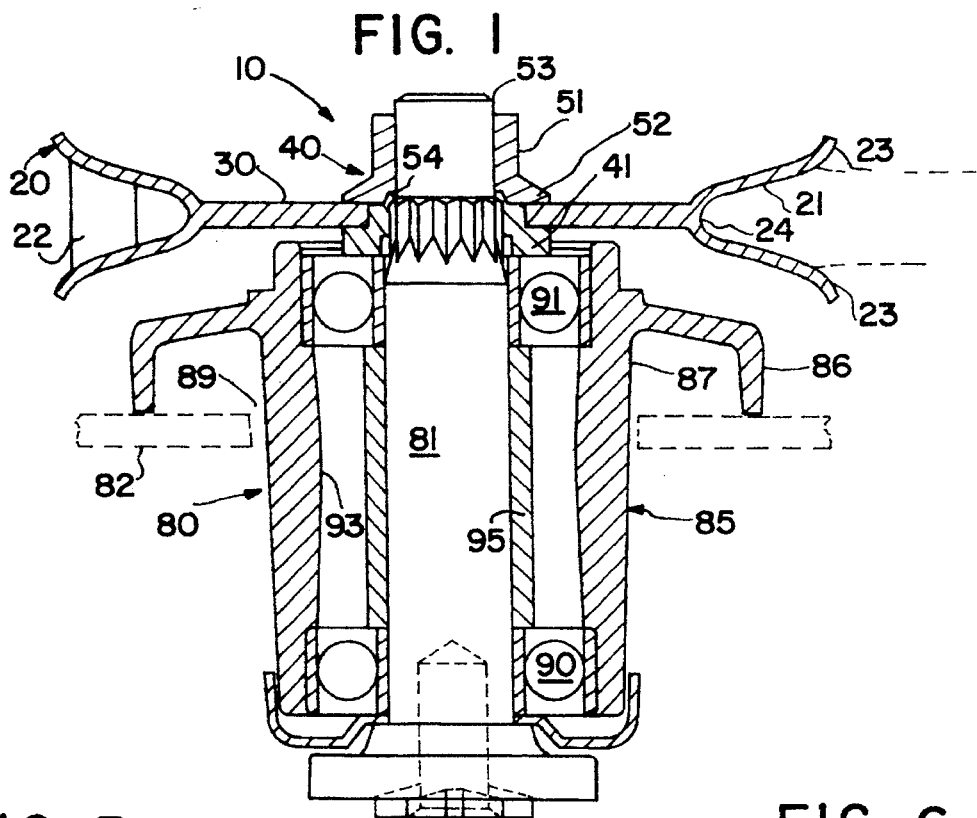
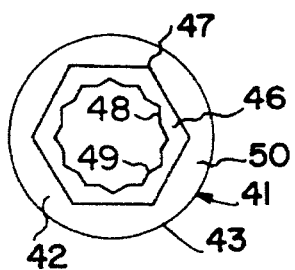
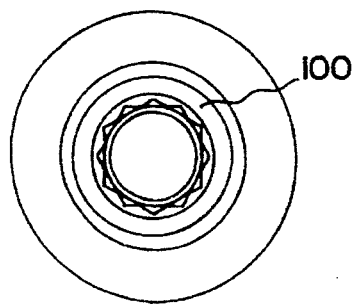
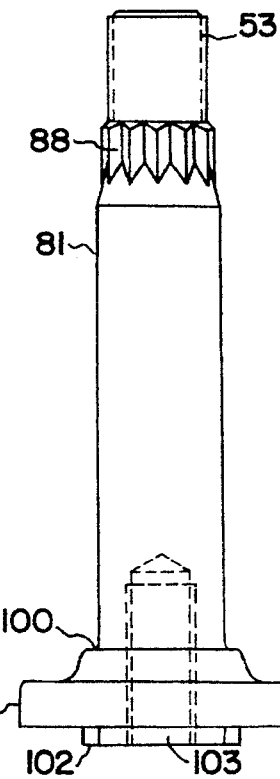
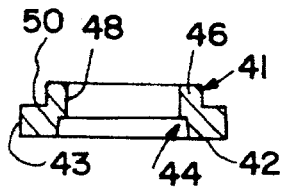

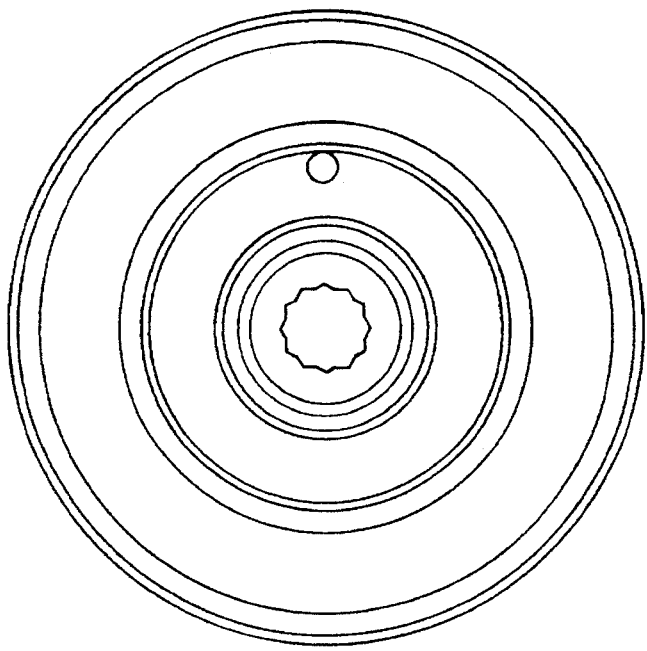
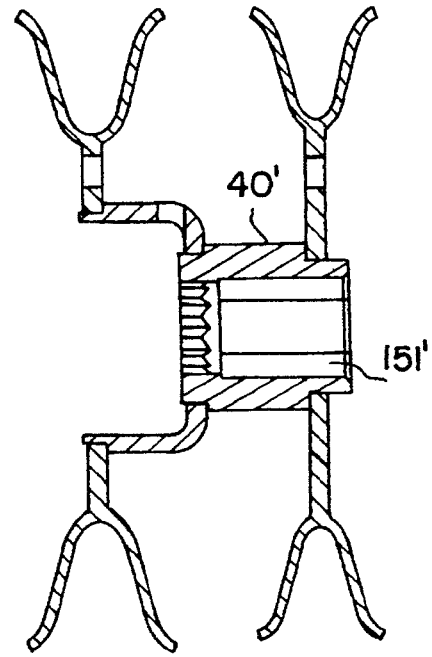
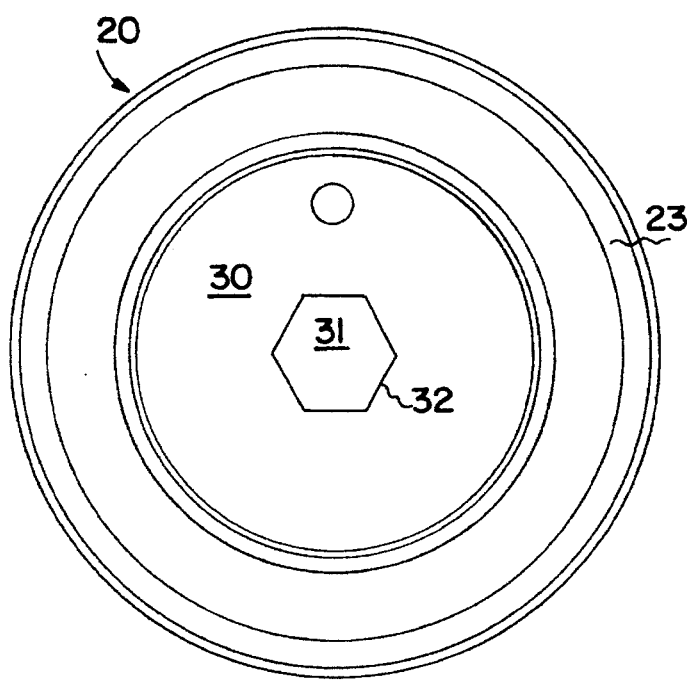
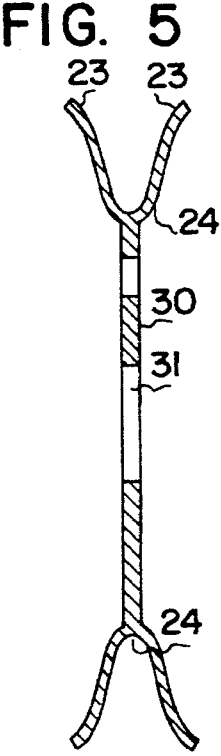

SPINDLE HUB SPACER INTERCONNECTION

This is a continuation of application Ser. No. 08/145,566 filed on Nov. 4, 1993, now abandoned.

FIELD OF THE INVENTION

This invention relates to a hub spacer interconnection for a rotating spindle.

BACKGROUND OF THE INVENTION

Spindle assemblies are commonly used to hold a rotary part while also providing for a fixed axis of rotation therefor. Examples include mower spindle assemblies which are used in rotary lawn mowers to drivingly interconnect a cutting blade with a belt driven pulley. Typically, these pulleys have large formed or welded flanges at the center thereof, which flanges interact with an end of the spindle in order to drivingly interconnect the two. These flanges are expensive to manufacture and inconvenient in use. In addition, they complicate the accompanying lawn mower by requiring a longer spindle shaft to accommodate for the extension of the flange. Further, due to the location of these flanges, the remaining construction of the spindle assembly, for example the bearings and bearing supports, are subject to increased forces.

The present invention is directed to providing an interconnection between a spindle shaft and an interconnected part having a planar surface without the difficulties of flange type construction.

OBJECTS AND SUMMARY OF THE INVENTION

It is an object of the present invention to provide for an improved interconnection between a spindle shaft and surrounding part.

It is another object of the present invention to simplify the construction of the interconnection between the spindle shaft and surrounding part.

It is yet another object of the present invention to reduce the cost of the interconnection between a spindle shaft and surrounding part.

It is still another object of the present invention to simplify the construction of drive spindle assemblies.

Is is a further object of the present invention to reduce the manufacturing cost of drive spindle assemblies.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein:

FIG. 1 is a cross sectional view of a mower drive spindle interconnection incorporating the invention of the application;

FIG. 2 is a cross sectional view of the hub spacer used in FIG. 1;

FIG. 3 is a downward view of the hub spacer of FIG. 2;

FIG. 4 is a downward view of the deck pulley utilized in the embodiment of FIG. 1;

FIG. 5 is a cross sectional view of the deck pulley of FIG. 5;

FIG. 6 is a side view of the spindle of the embodiment of FIG. 1;

FIG. 7 is an end view of the spindle of FIG. 7.

FIG. 8 is a downward view of a multiple pulley used in a modified FIG. 1 embodiment; and, FIG. 9 is a cross sectional view of the pulley of FIG. 8.

DETAILED DESCRIPTION OF THE INVENTION

The invention relates to an improved drive interconnection.

The basic drive interconnection 10 includes a deck pulley 20, a drive hub 40, and a spindle assembly 80.

The deck pulley 20 is along with the spindle shaft of the spindle assembly 80 one of the main operative members of the interconnection 10. By operative members it is meant that a rotating part is drivingly interconnected to another part such that rotary power passes therebetween. In the particular embodiment disclosed, the deck pulley 20 is a belt pulley having a generally "Y" shaped rolled groove 21 for accepting a belt (not shown), which belt is itself drivingly interconnected to an engine of a rotary lawn mower (not shown). The rolled groove 21 has two outwardly deflected edges 23 and a inward reduced diameter area 24. The outwardly deflected edges 23 aid in locating the belt 22 in the rolled groove 21 while the reduced diameter 24 compensates for the eventual wear of the belt as well as strengthening this area, both 23 and 24 cooperating to optimally interconnect the belt 22 to the deck pulley 20.

Immediately inward of the rolled groove 21 is a flat, substantially planar disc shaped section or surface 30. The outer diameter of this planar surface 30 interconnects to the rolled groove 21. There is a hole 31 formed in the center of the planar surface 30 substantially on longitudinal axis of the deck pulley 20. This hole 31 is formed with a series of inwardly extending protrusions 32. In the particular embodiment disclosed, these are flat protrusions to create a six point hexagonal shape. These protrusions provide for a solid drive with the later described hub 40. The hole 31 and the protrusions 32 are preferably formed in a simple stamping type operation. The planar surface 30 of the deck pulley 20 has a thickness less than that which it would had it been manufactured with an integral flange.

The hub 40 serves as the main power interconnection between the deck pulley 20 and the later described spindle shaft of the spindle assembly 80. A hub 40 accomplishes this purpose by increasing the effective diameter of the spindle shaft and effective thickness of the deck pulley 20 as well as, in the preferred embodiment disclosed, adapting one kind of a mechanical interconnection to another kind of mechanical interconnection (contrast to the six point hex on the hole 31 of the deck pulley 20 with the twelve pointed hex on the spindle shaft of the spindle assembly). The particular hub 40 disclosed includes a hub spacer 41 and a nut 51.

The hub spacer 41 includes a larger diameter lower section 42 having a surrounding surface 43 and a smaller diameter upper section 46 having outward protrusions 47. A shoulder 50 delineates the border line between the lower 42 and upper section 46.

The lower section 42 provides an increased diameter section upon which the planar surface 30 of the deck pulley 20 can rest. To minimize part numbers, this section 42 is preferably formed integrally with the rest of the hub spacer 41. It is preferred that the outer diameter of the surrounding surface 43 of the section 42 have a diameter significantly bigger than the effective diameter of the hole 31 in the deck pulley 20. This provides for a stable contact surface, a contact surface which retains the deck pulley 20 against angular wobbling in respect to the rotational axis of the later described spindle shaft. The lower section 42 in addition extends the axial depth of the hub spacer, thus increasing the extent of the later described inner protrusions 49. A small indent 44 cooperates with the later described bearing stack spindle length relationship so as to insure the proper bedding of the hub spacer 41 and nut 51. This indent could be eliminated or otherwise modified.

The outer diameter of the surrounding surface 43 is limited by the outer diameter of the planar surface 30 or the inner diameter of a surrounding part (in most instances). For example, in the particular embodiment disclosed, lower section 42 of the hub 40 rests directly on the inner race of a ball bearing 91 of the spindle assembly. For this reason, the outer diameter of the surrounding surface 43 should be selected to be of such a size that it does not contact any non-rotating parts of this bearing (the outer race for example) or differing speed rotating parts (the balls of the bearing for example).

In the particular embodiment disclosed, the diameter of the surrounding surface 43 is selected for a minimum ⅛" supporting contact (³⁄₁₆" maximum) outside of hole 31 to the deck pulley 20 to provide sufficient strength while maintaining acceptable manufacturing costs (i.e., greater diameter does not provide any real increase in service life, etc.). In addition to allowing for manufacturing tolerances, this also allows a single hub spacer 41 to be used with needle, sleeve, and other bearings having less of a radial clearance between a moving inner race and a stationary or differing speed outer race or part. Note that it is not necessary for the surrounding surface 43 to be formed in any particular shape. In that a simple circle allows for a manufacturing efficiency in the powder metal manufacture of the hub 40, that shape has been chosen for the preferred embodiment disclosed.

The upper section 46 of the hub spacer 41 passes the primary rotary forces between the deck pulley 20 and hub spacer 41. To accomplish this, the upper section 46 is formed with a series of outward protrusions 47, which outward protrusions 47 in turn drivingly interconnect to the inward protrusions 32 of the hole 31 in the deck pulley 20. Preferably, the shape of the outward protrusions 47 match the shape of the inward protrusions 32. Thus in the preferred embodiment disclosed, they are both formed with flat protrusions producing a six point hex shape. Due to the increased diameter of this mechanical interconnection between the hub spacer 41 and the deck pulley 20 as opposed to that which would be accomplished through direct interconnection of the spindle shaft to the deck pulley 20, the concentration of the forces are reduced to that which would be present if the same intersection were occurring directly to the smaller diameter spindle shaft. The height of the upper section 46 of the hub spacer 41 is selected to be slightly less than the depth of the planar section 30 of the pulley 20 (for reasons later set forth).

The hub spacer 41 in addition passes the rotary forces between the hub spacer 41 and the spindle shaft 81. To accomplish this, the hub spacer 41 has a central hole 48 formed therein, which hole 48 has a series of inwardly extending protrusions 49 formed therein, which inward protrusions 49 in turn drivingly interconnect to outwardly extending protrusions 88 near the end of the spindle shaft 81. Again, preferably the shape of the inward protrusions 49 match the shape of the outward protrusion 88 on the spindle shaft 81. In the preferred embodiment shown, these protrusions are triangular producing a twelve point hex. Note that the protrusions 49 extend substantially for the full depth of the hub spacer 41 (in contrast with the protrusions 47 that extend only for the depth of the upper section 46). This increase in extension reduces the concentration of the forces on a unit section of the hub spacer 41 by providing more surface area at the smaller diameter hub spacer 41 spindle shaft 81 interconnection. This is preferred.

The nut 51 is located on the opposite side of the deck pulley 20 so as to capture the planar surface 30 between the lower section 42 of the hub spacer 40 and the flange 52 on the nut. To minimize part number and maximize strength, the flange 52 is again preferably formed integrally with the nut 51. The outer diameter of the flange 52 is selected to be larger than the outer diameter of the hole 31 through the planar surface 30 in the deck pulley. Note that since customarily there are no interfering non-rotating parts just above the pulley, the size of the nut 51 and flange are determined most often simply by needed strength. Except to add further anti wobble strength, there is normally no need for the flange 52 to be larger in diameter than the hub spacer 41.

Tightening the nut 51 down on the threaded end 53 of the spindle shaft physically captures the planar surface 30 between the hub spacer 41 and the nut 51 as later described, thus holding the deck pulley 20 to the spindle shaft 81 for rotation therewith. In this respect, it is preferred that the inner diameter of the flange 52 have a small cutaway 54 so as to allow clearance for any residual extensions of the twelve point hex 88 which might extend interfering off of the spindle shaft. This insures that the nut 51 solidly captures the planar surface 30 against the hub spacer 41. This also allows the protrusions 88 to extend 100% through the hub spacer 41, maximizing available surface contact area. This also compensates for any manufacturing dimensional tolerances that may occur in the production of the device.

The spindle assembly 80 completes the interconnection. The spindle assembly retains the spindle shaft 81 in rotational alignment with a fixed non-rotating surface such as a mower deck 82. It, in addition, provides a bearing stack so as to provide a reaction surface for the nut 51 which interconnects the deck pulley 20 and hub 40 to the spindle shaft 81.

The particular spindle assembly 80 disclosed includes a spindle housing 85 having a mounting flange 86 and a cylindrical body 87.

The spindle housing 85 is a die cast aluminum piece designed to retain the spindle shaft 81 in rotational and positional alignment in respect to the mower deck 82. The particular spindle housing 85 disclosed is inserted through a hole 89 in the mower deck 82 and thence bolted to the mower deck by bolts (not shown). This retains the cylindrical body 87 in a fixed position in respect to the mower deck 82. Two bearings 90, 91 are located on the inside of the cylindrical body 87. At least one of these bearings is fixedly located in respect to the axis of the cylindrical body 87 so as to retain the spindle shaft 81 in position. This is accomplished in the preferred embodiment by a small reduced diameter section 93 reduces the effective diameter of the inner hole of the cylindrical body in respect to the bearings 90, 91. The top edge of this reduced section 93 holds the upper bearing 91 from downward movement and the bottom edge of this reduced section 93 holds the lower bearing from upward movement. This in combination with the bearing spacer 95 fixedly holds the bearings 90, 91 (and thus holds the spindle shaft 81) in axial location in respect to the spindle housing 85. As the axial length of the spacer 95 is preferably slightly greater than the axial length of the reduced diameter section, the bearing stack 90, 95, 91 floats slightly in respect to the housing 85. This allows this stack to cooperate with the later described spindle shaft 81 to create a reaction surface for the nut 51, thus completing localization of the critical spindle shaft 81 of the spindle assembly 80.

The spindle shaft 81 is inserted through the internal race of the bearing 90, the spacer 95, and the internal race of the bearing 91 so as to position the protrusion twelve point hex 88 at a location extending above the inner race of the bearing 91. Since, in the embodiment shown, the protrusions have a slightly lesser diameter than the spindle shaft 81 diameter preferably the start of the increase in diameter is located below the top of the inner race of the upper bearing 91, this so the hub spacer 41 does not bottom on the top of the spindle shaft 81 before such inner race. The optional indent 44 in the hub spacer 41 compensates further for dimensional tolerances by increasing the effective length of the two bearing 90, 91 spacer 95 stack, thus allowing for a compromise spindle shaft protrusion changeover.

The spindle shaft 81 itself includes a seat 100, a blade mounting flange 101, a key 102, and a threaded hole 103 at its lower end.

The blade mounting flange 101 serves to provide angular support for the mower blade which is interconnected to the bottom of the spindle shaft 81. The key 102 in turn rotatively connects the spindle shaft 81 to the blade, with the threaded hole 103 being utilized with a bolt (not shown) to hold the blade onto the spindle shaft 81 in physical contact with the blade mounting flange 101.

The seat 100 provides a reaction surface against which the stack of the inner race of the bearing 90, the spacer 95, and the inner race of the bearing 91 interact so as to provide a reaction surface for tightening the nut 51 in respect to the threaded end 53 of the spindle shaft 81. In specific, in the preferred embodiment disclosed, the minimum distance between the seat 100 and the lower part of the twelve point hex protrusion 88 of the spindle shaft 82 (i.e., the start of the decrease in diameter) is selected to be equal to or more than the aggregate of the axial height of the inner race of the bearing 90, the axial length of the spacer 95, and the axial length of the inner race of the bearing 91 (compensating appropriately for tolerances and features like the indent 44). (With a single diameter shaft 91 including protrusions 88, the start of a change in cross section would define the critical distance.) With this orientation, upon tightening of the nut 51 onto the threaded end of the spindle shaft 81, the flange 52 of the nut will be solidly physically seated against the upper part of the planar surface 30 of the deck pulley 20 prior to the nut 51 contacting the twelve point hex 88 of the spindle shaft 81. Further due to the height of the upper section 46 of the hub spacer 41 relative to the depth of the planar section 30 of the pulley 20, the nut 51 does not contact the upper surface of the hub spacer 41. This seating also occurs prior to the bearing 91 and the bearing 90 tightening down on the reduced diameter section 93 of the spindle housing 85. The result is that the planar surface 30 of the deck pulley 20 is solidly captured physically between the nut 51 and the hub spacer 41, with the spindle housing 85 being non-loading factor and the spindle shaft 81 providing a reaction load. This orientation insures that the deck pulley 20 will be solidly interconnected to the spindle shaft 81 through the hub spacer 41 under any and all assembly conditions irrespective of the dimensional tolerances which may exist in the various parts of the interconnect 10.

Although the invention has been described in its preferred embodiment with a certain degree of particularity, it is to be understood that numerous changes can be made without deviating from the invention as hereinafter claimed.

For example, although the flange 52 is disclosed as being integral with the nut 51 (as the lower section 42 and upper section 46 of the hub spacer 41), it is to be understood that this could be a separate washer or other part. Similarly, although a twelve point hex is disclosed at the end of the spindle shaft 81, and a six point hex is disclosed between the hub spacer 41 and the deck pulley 20, other varying protrusions and interconnects could be utilized. In addition, for example in a multiple spindle mower deck, the deck pulley 20 could be modified to provide for a multiple pulley interconnection to the spindle shaft 81, one pulley for connection to the engine and the other(s) for connection to other spindle assemblies. A version of this is shown in FIG. 8 and 9 wherein a powder metal hub spacer $40^1$ is used with an extended length shaft (with the section $151^1$ extending the length of the bearing 90, 91 spacer 95 stack correspondingly). A nut 51 is still used to retain such spacer $40^1$ onto the threads 53 of the elongated spindle shaft 81. Other modifications are also possible.

What is claimed:

1. An interconnection between a spindle and a surrounding part having a planar section with first and second surfaces and a through hole extending from the first surface to the second surface, the interconnection comprising a hub spacer, said hub spacer having a central hole, a first section having surrounding outer surface and a width to allow the first section to be inserted into the through hole in the planar section, and a second section having a width that is greater than the width of said first section wherein said second section defines a shoulder between said first and second sections, said central hole being formed with inwardly extending protrusions, the spindle being formed with outwardly extending protrusions, said inwardly extending protrusions of said hub spacer drivingly engaging said outwardly extending protrusions of the spindle, said surrounding outer surface of said first section being formed with outwardly extending protrusions, the through hole in the planar section having inwardly extending protrusions formed along the full length of the through hole, and said outwardly extending protrusions of said surrounding outer surface of said first section drivingly engaging said inwardly extending protrusions of said through hole in the planar section.

2. The interconnection of claim 1 characterized by an addition of a nut, said nut being on the second surface of said planar section so as to capture the planar section between the hub spacer and a flange on the nut.

3. The interconnection of claim 2 characterized in that said flange is integral with said nut.

4. An interconnection between a spindle and a surrounding part, said surrounding part having a planar section with first and second surfaces and a through hole extending from the first surface to the second surface, the interconnection comprising a hub spacer, said hub spacer having a central hole, a first section having surrounding outer surface and a width to allow the first section to be inserted into the through hole in the planar section, and a second section having a width that is greater than the width of said first section wherein said second section defines a shoulder between said first and second sections, said central hole being formed with inwardly extending protrusions, the spindle being formed with outwardly extending protrusions, said inwardly extending protrusions of said hub spacer drivingly engaging said outwardly extending protrusions of the spindle, said surrounding outer surface of said first section being formed with outwardly extending protrusions, the through hole in the planar section being formed with inwardly extending protrusions extending along the full length of the through hole, said first surface of the planar section contacting said shoulder, said outwardly extending protrusions of said surrounding outer surface of said first section drivingly engaging said inwardly extending protrusions of the through hole in the planar section, a capture means, said capture means being on the second surface whereby said capture means engages the spindle so as to hold the planar section in contact with said shoulder.

5. The interconnection of claim 4, wherein the spindle has a bearing seat, a bearing inner surface means contacting said bearing seat, said bearing means having an axial length relative to the spindle such that said capture means engaging the spindle engages said bearing means with said bearing seat.

6. The interconnection of claim 4, wherein said hub spacer has a bottom surface and the spindle has a bearing seat, a first bearing having an inner race seated on said bearing seat, a second bearing having an inner race seated on said bottom surface of said hub spacer, means to space said first bearing and said second bearing such that said capture means engaging the spindle engages said inner race of said first bearing with said bearing seat and said inner race of said second bearing to said bottom surface of said hub spacer.

7. The interconnection of claim 4, wherein the through hole in the planar section has a depth and said first section has a height and said height of said first section being less that said depth of said through hole.

8. The interconnection of claim 7, wherein the capture means has a bottom surface and said outwardly extending protrusions of the spindle extend through said through hole in the planar section, and the bottom surface of said capture means being formed with a recess to provide clearance space for said outwardly extending protrusions of the spindle.

9. The interconnection of claim 4, wherein said capture means has a bottom surface and said outwardly extending protrusions of the spindle extend through said through hole in the planar section, and the bottom surface of said capture means being formed with a recess to provide a clearance space for said outwardly extending protrusions of the spindle.

10. The interconnection of claim 4, wherein said capture means has a diameter and said shoulder has a diameter, and said diameter of said capture means being greater than said diameter of said shoulder.

11. The interconnection of claim 4, wherein said first section of said hub spacer has a height, the through hole in the planar section has a depth and said height of said first section of said hub spacer is less than the depth of the through hole.

12. The interconnection of claim 4, wherein the interconnection is a part of a spindle assembly including a spindle housing having a cylindrical body and a mounting flange and a mower deck with a hole, said cylindrical body of said spindle housing being inserted through said hole in the mower deck after assembly of the spindle assembly with said mounting flange engaging the mower deck surrounding said hole.

13. An interconnection between a spindle and a surrounding part, said surrounding part having a planar section with first and second surfaces, a through hole extending from the first surface to the second surface, and a depth, the interconnection comprising a hub spacer, said hub spacer having a central hole and a depth, a first section having surrounding outer surface and a width to allow the first section to be inserted into the through hole in the planar section, and a second section having a width that is greater than the width of said first section wherein said second section defines a shoulder between said first and second sections, said central hole being formed with inwardly extending protrusions, the spindle being formed with outwardly extending protrusions, said inwardly extending protrusions of said hub spacer drivingly engaging said outwardly extending protrusions of the spindle, said depth of said planar section being less than said depth of said hub spacer, said surrounding outer surface of said first section being formed with outwardly extending protrusions, the through hole in the planar section being formed with inwardly extending protrusions extending along the full length of the through hole, said first surface of the planar section contacting said shoulder, and said outwardly extending protrusions of said surrounding outer surface of said first section drivingly engaging said inwardly extending protrusions of the through hole in the planar section.

14. The interconnection of claim 13, characterized by an addition of means for said shoulder to provide a stable contact surface for the planar section against angular wobbling.

15. The interconnection of claim 13 characterized in that an outer diameter of the second section of the hub spacer does not contact any non-rotating parts.

16. An interconnection between a spindle and a surrounding part, said surrounding part having a planar section with first and second surfaces and a through hole extending from the first surface to the second surface, the interconnection comprising a hub spacer, said hub spacer having a central hole, a first section having surrounding outer surface and a width to allow the first section to be inserted into the through hole in the planar section, and a second section having a width that is greater than the width of said first section wherein said second section defines a shoulder between said first and second sections, said central hole being formed with inwardly extending protrusions, the spindle being formed with outwardly extending protrusions, said inwardly extending protrusions of said hub spacer drivingly engaging said outwardly extending protrusions of the spindle, said surrounding outer surface of said first section being formed with outwardly extending protrusions, the through hole in the planar section being formed with inwardly extending protrusions extending along the full length of the through hole, said first surface of the planar section contacting said shoulder, said outwardly extending protrusions of said surrounding outer surface of said first section drivingly engaging said inwardly extending protrusions of the through hole in the planar section, a nut, said nut being on the second surface of the planar section for said nut to engage the spindle so as to hold the planar section about said first section of said hub spacer in physical contact with said shoulder.

17. The interconnection of claim 16 characterized in that said first section of said hub spacer has a height, the planar section has a depth and said height of said first section of said hub spacer is less than the depth of the planar section.

* * * * *